United States Patent [19]

Sowden

[11] Patent Number: 5,628,847

[45] Date of Patent: May 13, 1997

[54] SYSTEM FOR APPLYING A HEAT-SHRINKABLE SLEEVE TO A CONTAINER

[75] Inventor: Harry Sowden, Philadelphia, Pa.

[73] Assignee: McNeil-PPC, Inc., Skillman, N.J.

[21] Appl. No.: 419,782

[22] Filed: Apr. 11, 1995

Related U.S. Application Data

[60] Division of Ser. No. 96,087, Jul. 23, 1993, Pat. No. 5,475,969, which is a continuation-in-part of Ser. No. 794,558, Nov. 19, 1991, Pat. No. 5,390,477.

[51] Int. Cl.⁶ .................................................. B32B 31/24
[52] U.S. Cl. ............... 156/86; 156/DIG. 9; 156/DIG. 51
[58] Field of Search ...................... 156/64, 84, 85, 156/86, 368, 380.9, DIG. 9, DIG. 14, DIG. 15, DIG. 36, DIG. 51, 272.2

[56] References Cited

U.S. PATENT DOCUMENTS

| | | | |
|---|---|---|---|
| 833,896 | 10/1906 | Gaynor | 53/216 |
| 1,595,829 | 10/1926 | Furbush . | |
| 2,017,450 | 10/1935 | Van Veen | 156/DIG. 36 |
| 2,124,010 | 7/1938 | Smith, Jr. et al. | 198/779 |
| 2,154,844 | 4/1939 | Harker et al. | 198/779 |
| 2,696,978 | 12/1954 | Siegel . | |
| 2,938,319 | 5/1960 | Nystrand | 53/216 |
| 3,312,811 | 4/1967 | Shanklin . | |
| 3,378,989 | 4/1968 | Denker . | |
| 3,513,293 | 5/1970 | Beck . | |
| 3,523,402 | 8/1970 | West et al. | 53/557 |
| 3,597,852 | 8/1971 | McCollough | 53/557 |
| 3,619,103 | 11/1971 | Williams et al. | 8/484 |
| 3,619,864 | 11/1971 | Birch . | |
| 3,659,394 | 5/1972 | Hartleib et al. | 53/557 |
| 3,712,020 | 1/1973 | Norr et al. . | |
| 3,760,968 | 9/1973 | Amberg et al. . | |
| 3,767,496 | 10/1973 | Amberg et al. . | |
| 3,802,942 | 4/1974 | Amberg et al. . | |
| 3,822,459 | 7/1974 | Amberg et al. . | |
| 3,864,546 | 2/1975 | Cahnman et al. | 342/417 |
| 3,901,381 | 8/1975 | Quinn . | |
| 3,927,484 | 12/1975 | Spiegel et al. . | |
| 3,959,065 | 5/1976 | Ashcroft . | |
| 4,005,774 | 2/1977 | Valero . | |
| 4,016,706 | 4/1977 | Braker et al. | 53/442 |
| 4,034,186 | 7/1977 | Bestenbreiner et al. . | |
| 4,048,281 | 9/1977 | Brummett et al. . | |
| 4,049,947 | 9/1977 | Bestenreiner et al. . | |
| 4,059,400 | 11/1977 | Heckman et al. . | |
| 4,072,553 | 2/1978 | Braker et al. . | |
| 4,092,382 | 5/1978 | Heckman et al. . | |
| 4,172,873 | 10/1979 | Spicer | 156/86 |
| 4,184,309 | 1/1980 | Amberg . | |
| 4,237,675 | 12/1980 | Myers . | |
| 4,325,762 | 4/1982 | Burmeister et al. . | |

(List continued on next page.)

FOREIGN PATENT DOCUMENTS

| | | |
|---|---|---|
| 0397580 | 11/1990 | European Pat. Off. . |
| 2533148 | 7/1974 | Germany . |
| 1062349 | 3/1967 | United Kingdom . |
| 2192700 | 1/1988 | United Kingdom . |
| 2224712 | 5/1990 | United Kingdom . |

*Primary Examiner*—Michael W. Ball
*Assistant Examiner*—Richard Crispino
*Attorney, Agent, or Firm*—Bernard F. Plantz

[57] ABSTRACT

An improved system for applying labels to pharmaceutical vials or the like includes a heating tunnel assembly having an insulated heating chamber defined by a first stationary portion and a second removable portion, with a heater positioned within the insulated heating chamber. The assembly includes movable mounting structure for mounting the second removable portion of the insulated heating chamber for movement between a first position engaged with the first stationary portion, and a second retracted position remote from said first portion. An actuator is provided for moving the second portion of the insulated heating chamber into its engaged position, while a biasing spring resiliently biases the second removable portion of the chamber toward the retracted position. As a result, the heating tunnel assembly will automatically be opened to prevent products from overheating or burning in the event of an emergency that disables the actuator.

3 Claims, 8 Drawing Sheets

U.S. PATENT DOCUMENTS

| | | |
|---|---|---|
| 4,406,721 | 9/1983 | Hoffman . |
| 4,416,714 | 11/1983 | Hoffman . |
| 4,447,280 | 5/1984 | Malthouse . |
| 4,464,884 | 8/1984 | Franks ................................... 53/557 |
| 4,496,409 | 1/1985 | Kontz . |
| 4,501,072 | 2/1985 | Jacobi, Jr. et al. . |
| 4,507,137 | 3/1985 | Edwards, Jr. et al. . |
| 4,545,832 | 10/1985 | Hoffmann ................................ 156/86 |
| 4,562,688 | 1/1986 | Mueller ................................... 53/442 |
| 4,579,614 | 4/1986 | Burmeister et al. . |
| 4,640,726 | 2/1987 | Sallee et al. . |
| 4,766,033 | 8/1988 | Yoshimura et al. . |
| 4,780,040 | 10/1988 | Petersen . |
| 4,813,559 | 3/1989 | Kenyon, II . |
| 4,872,931 | 10/1989 | Mitchell . |
| 4,923,557 | 5/1990 | Dickey . |
| 4,939,232 | 7/1990 | Fukuda et al. . |
| 4,945,707 | 8/1990 | Cosmo ..................................... 53/442 |
| 4,983,238 | 1/1991 | Yoshida et al. . |
| 5,031,298 | 7/1991 | Fresnel . |
| 5,070,180 | 12/1991 | Fukuda et al. . |
| 5,390,477 | 2/1995 | Sowden .................................... 53/557 |
| 5,818,182 | 6/1974 | Linde . |

SYSTEM FOR APPLYING A HEAT-SHRINKABLE SLEEVE TO A CONTAINER

This is a division of application Ser. No. 08/096,087, filed Jul. 23, 1993, now U.S. Pat. No. 5,475,969 issued Dec. 19, 1995, which is a continuation-in-part of Ser. No. 07/794,558, filed Nov. 19, 1991, now U.S. Pat. No. 5,390,477 issued Feb. 21, 1995, both of which are hereby incorporated by reference.

BACKGROUND OF THE INVENTION

1. Field of the Invention

This invention relates to the field of processing and packaging consumer products, particularly in the pharmaceutical industry. More specifically, this invention relates to an improved apparatus and method for applying a heat shrinkable sleeve to a container such as a vial for pharmaceuticals that is safer, more efficient, and more precise than other systems and methods that have been used for such purposes in the past.

2. Description of the Prior Art

In most instances, containers that are used to hold a consumer product such as a medicament need a label to specifically identify the goods contained therein. In addition, to protect consumers, manufacturers of over-the-counter pharmaceuticals and certain types of foods and beverages often provide a tamper evident seal in their packaging which becomes permanently broken or ruptured when the container is first opened.

Frequently, a label itself is used as a tamper evident seal by adhering portions of the label to two or more relatively displaceable components of the packaging. For example, a tamper evident seal can be achieved in a vial that has a removable cap by adhering portions of a label to both the body of the vial and the removable cap.

In practice, the most efficient way to apply a label or tamper evident sleeve to many containers is to place a heat shrinkable sleeve or label about the container, and then to shrink the sleeve or label against the container by passing both the sleeve or label and the container through a heat tunnel apparatus. For small containers such as pharmaceutical vials, though, it is often difficult to ensure that the sleeve or label shrinks uniformly around the periphery of the vial. Non-uniform shrinkage presents a problem, particularly when it is a label that is being applied, because it can cause distortion of printed messages and designs which appear on the labelling. In view of government regulations, concern for the consumer and quality control standards, most pharmaceutical marketers will not tolerate such deviations in product labelling.

Another problem with heat shrinkable labelling is that the heat tunnel apparatus that is used to apply the labelling can malfunction, possibly resulting in damage to the products or in an otherwise dangerous situation.

A long and unfilled need in the prior art exists for a system for applying a heat shrinkable sleeve or label to a container such as a vial for pharmaceuticals which reduces distortion and unwanted displacement of the sleeve or label during its application, and which prevents product damage or other dangerous situations from developing as a result of a malfunction of a heat tunnel apparatus.

SUMMARY OF THE INVENTION

Accordingly, it is an object of the invention to provide a system for applying a heat shrinkable sleeve to a container such as a vial for pharmaceuticals which effectively reduces distortion and unwanted displacement of the label during its application.

It is further an object of the invention to provide a system for applying a heat shrinkable sleeve or label to a container which is protected against product damage or dangerous safety conditions that might otherwise occur during a malfunction of the heat tunnel apparatus that is used to shrink the sleeve or label onto the container.

To achieve the above and other objects of the invention, a fail-safe heating tunnel assembly may include an insulated heating chamber defined by a first stationary portion and a second removable portion; a heater positioned within the insulated heating chamber; movable mounting structure for mounting the second removable portion of the insulated heating chamber for movement between a first position engaged with the first stationary portion, and a second retracted position remote from the first portion; actuator structure for moving the second portion of the insulated heating chamber into its engaged position; and biasing structure for resiliently biasing the second removable portion of the chamber toward the retracted position, whereby the heating tunnel assembly will be opened to prevent products within the assembly from overheating or burning in the event of an emergency that disables the actuator structure.

According to a second aspect of the invention, a heat tunnel assembly for applying a heat-shrinkable sleeve to a container such as a vial for pharmaceuticals includes an insulated heating chamber defined by a first stationary portion and a second removable portion; a heater positioned within the insulated heating chamber; conveyor structure for moving an article through the insulated heating chamber; movable mounting structure for mounting the second removable portion of the insulated heating chamber for movement between a first position engaged with the first stationary portion, and a second retracted position remote from the first portion; actuator structure for moving the second portion of the insulated heating chamber into its engaged position; and biasing structure for resiliently biasing the second removable portion of the chamber toward the retracted position, whereby the heating tunnel assembly will be opened to prevent the containers from overheating or burning in the event of an emergency that disables the actuator structure.

According to a third aspect of the invention, a method of applying a heat shrinkable label to a container, includes steps of (a) fitting a heat-shrinkable label about a container; (b) conveying the container together with the label along a path; (c) positioning a heater along the path by an actuator while simultaneously biasing the heater away from the path, whereby the label will be shrink-fitted onto the container; and (d) deactivating the actuator in the event of an emergency, whereby the heater will be withdrawn from the path in a fail-safe manner by the biasing, and overheating or burning of the container and the label will be prevented.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
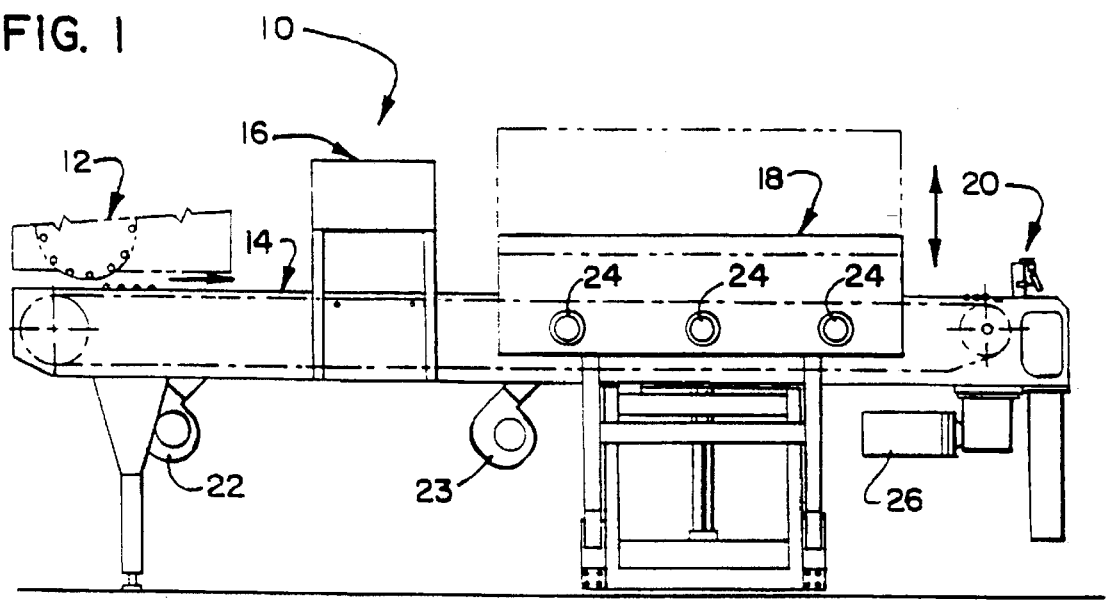
FIG. 1 is a partially diagrammatical side elevational view of a system according to a first preferred embodiment of the invention.
Figure 2:
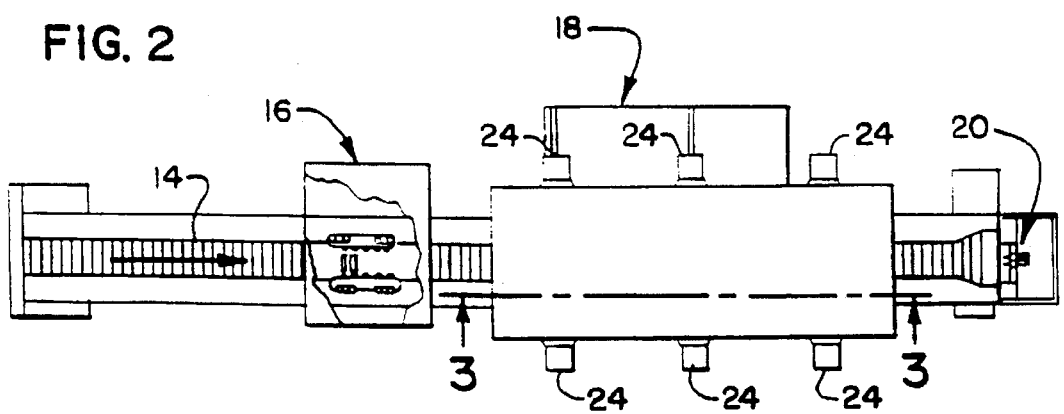
FIG. 2 is a partially diagrammatical top plan view of the system depicted in FIG. 1.

Referring now to the drawings, wherein like reference numerals designate corresponding structure throughout the views, and referring in particular to FIGS. 1 and 2, a system for applying a heat shrinkable sleeve to a container such as a vial for pharmaceuticals includes a station 12 for inserting a vial into a heat shrinkable sleeve or label. Sleeve-vial assembly station 12 may be, for example, a model LSA-710 Horizontal Sleeving Machine, which is manufactured by American Fuji Seal, Inc. A conveyor 14 is provided to transport vials having a sleeve fitted thereon from station 12 through a sleeve positioning station 16 and through a heat tunnel assembly 18. Sleeve positioning station 16 utilizes rotating anvils which squeeze at the ends of the vials and position the overhang of the sleeve in relation to the vial to assure proper label placement. An ultraviolet sleeve detector 20 is positioned adjacent to conveyor 14 on a side of heat tunnel assembly 18 which is opposite from sleeve positioning station 16. The purpose of sleeve detector 20 is to verify that a sleeve or label has in fact been applied to the container before the container is passed on for further packaging or processing.

As may be seen in FIG. 1, system 10 further includes a pair of blowers 22, 23, the purpose of which is to cool down conveyor 14 after it has passed through heat tunnel assembly 18. Blowers 24 are also provided for circulating hot air within heat tunnel assembly 18. An electric drive motor 26 for conveyor 14 may also be seen in FIG. 1.

Figure 3:
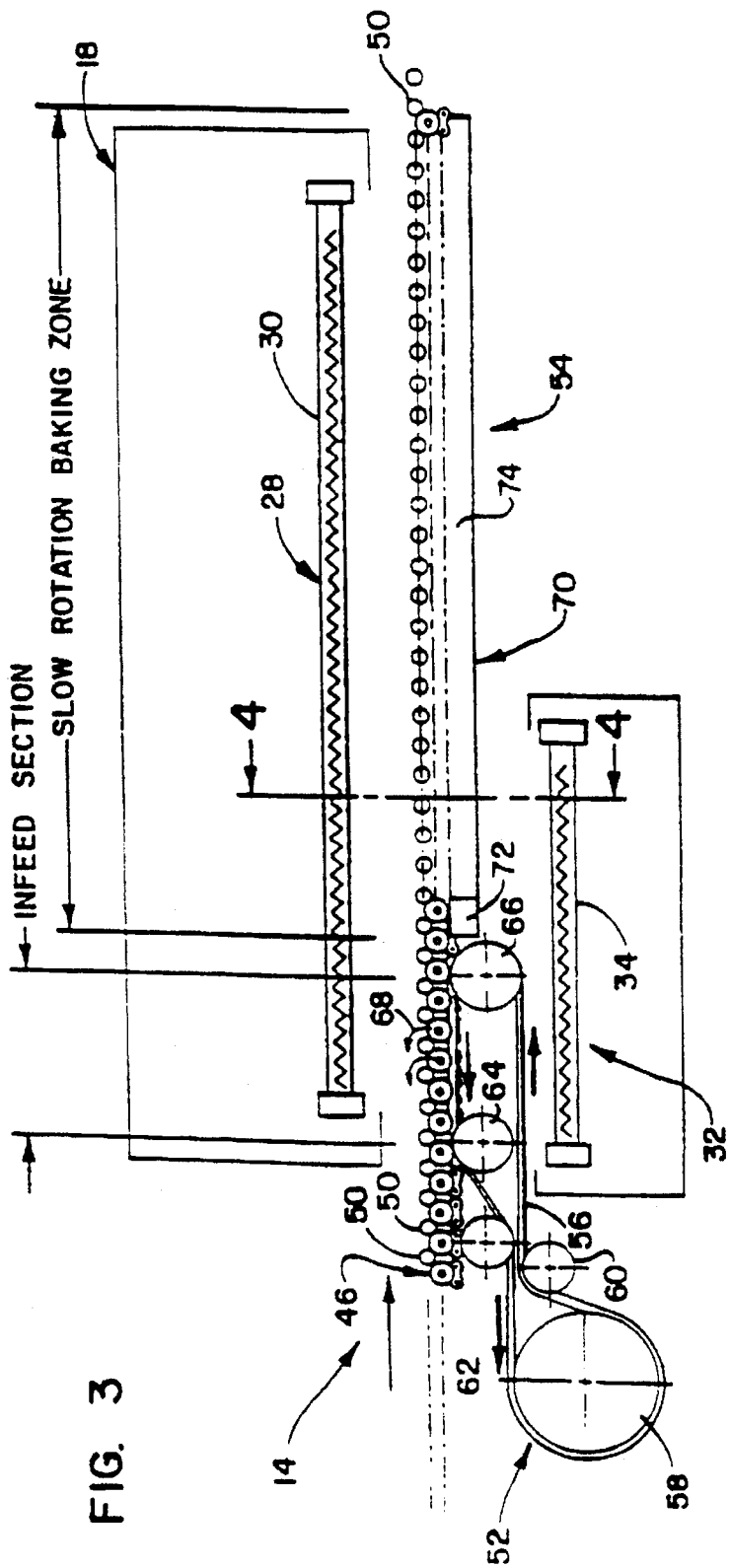
FIG. 3 is a partially diagrammatical cross sectional view taken along lines 3—3 in FIG. 2.
Figure 4:
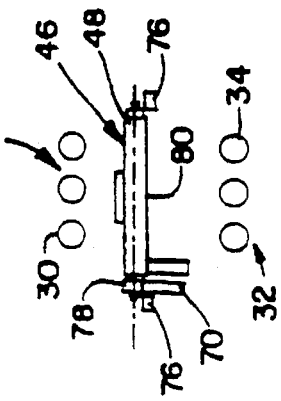
FIG. 4 is a cross-sectional view taken along lines 4—4 in FIG. 3.
Figure 5:
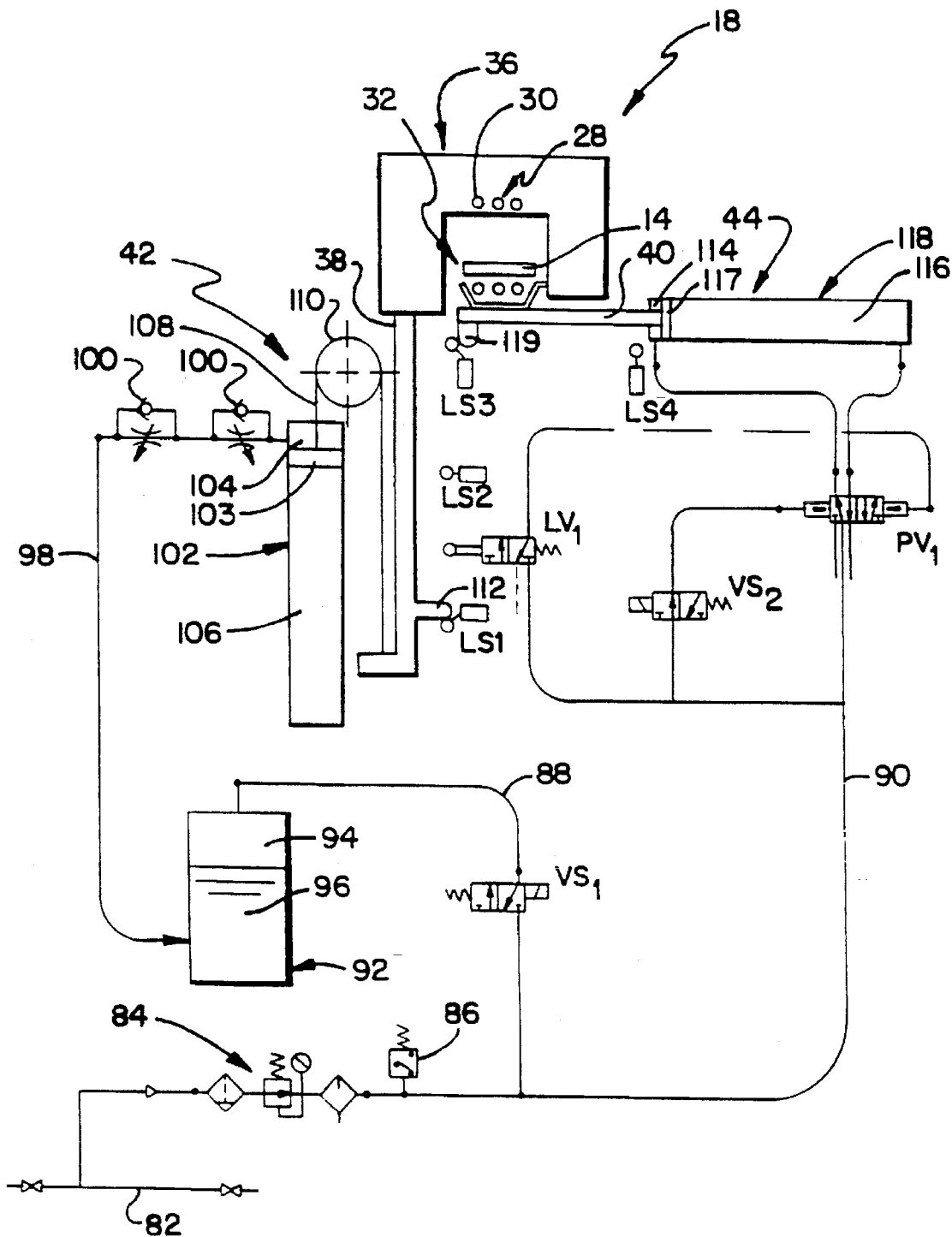
FIG. 5 is a pneumatic/hydraulic schematic diagram which depicts the pneumatic/hydraulic components of the system illustrated in FIGS. 1–4.

Referring now to FIGS. 3–5, it will be seen that heat tunnel assembly 18 includes an upper heat source 28, which preferably includes a plurality of electric heating elements 30. Heat tunnel assembly 18 also includes a lower heat source 32 which, in a preferred embodiment, is a plurality of lower electric heating elements 34. As is shown schematically in FIG. 5, the upper heating element 30 are supported by a cantilevered portion 36 of the first support member 38 that is provided for supporting the upper heat source 28 above conveyor 14. A second support member 40 is provided for supporting lower heat source 32 and its heating elements 34 beneath conveyor 14. As is shown in FIG. 5, a first assembly 42 is provided for vertically shifting first support member 38 between first and second positions marked by limit switches LS1 and LS2. A second shifting assembly 44 is provided for horizontally shifting second support member 40 between positions which are coincident with the respective locations of limit switches LS3 and LS4. The specific construction and operational purposes of shifting assemblies 42, 44 will be discussed in greater detail below.

Referring to FIGS. 3 and 4, it will be noted that heat tunnel assembly 18 includes a novel assembly 46 for applying a progressive force along an outer surface of a sleeve which has been applied upon a container vial. Assembly 46 applies such force against the sleeve in the direction of the container by supporting the container vials 50 between adjacent roller members 48 on conveyor 14. Preferably, roller members 48 are coated with a silicone rubber and are mounted at each end by bearings which permit each roller member 48 to roll freely without constraint unless the roller member 48 is engaged with either a first roller drive assembly 52 or a second roller drive assembly 54, the details of which will be discussed shortly. An outer race or sleeve of the bearings which support each end of each roller member 48 is supported on a respective link 76 of conveyor 14, so that the roller members 48 travel along with conveyor 14 in a spaced, parallel relationship. Each roller member 48 is mounted for rotation with a spur gear 78 which is positioned on one side of the roller member 48.

According to one novel aspect of the invention, the first roller drive assembly 52 is designed to rotate roller members 48 at a first rate during initial shrinkage of the sleeve or label onto container vial 50, and second roller drive assembly 54 is constructed to rotate the rollers 48 at a second, slower rate after the initial shrinkage has occurred. This has been found to reduce distortion and unwanted displacement of the sleeve or label during its application. Referring now to FIG. 3, it will be seen that first roller drive assembly 52 includes a friction belt 56, which preferably is constructed as a timing belt to avoid slippage with respect to a drive pulley 58, and first through fourth idlers 60, 62, 64, and 66, respectively. Friction belt 56 is preferably made from material which is flexible, has a relatively high coefficient of friction, and is relatively heat resistant. Rubber, butyl and nitrile polymers, among others, have the requisite characteristics for friction belt 56. As may be seen in FIG. 3, third idler 64 and fourth idler 66 are positioned so as to force an outside surface of friction belt 56 against respective lower surfaces 80 of the roller members 48 within the infeed section which is illustrated in FIG. 3. Drive pulley 58 is driven by an electrical motor which is speed-adjustable, and is driven in a counterclockwise direction. This causes friction belt 56 to move in a right to left direction as viewed in FIG. 3, thus, in conjunction with the movement imparted by the motor of the conveyor 14, causing roller members 48 to rotate in a clockwise direction and the container vial 50 to rotate in the direction indicated by arrow 68 in FIG. 3. The operation of first roller drive assembly 52 will be discussed in greater detail below.

Second roller drive assembly 54 includes a rack 70 which extends parallel to and slightly beneath conveyor 14 to define a slow rotation baking zone, as is indicated diagrammatically in FIG. 3. Rack 70 includes a toothed upper surface which is designed to mesh with the spur gears 78 on the respective roller members 48 as the roller members 48 are drawn along rack 70 through the motion of conveyor 14. Rack 70 includes a first rack portion 72 which is preferably fabricated from a soft-resilient material such as rubber to lessen the shock when a spur gear 78 suddenly comes into contact with rack 70. Second rack portion 74 is identical in cross-section and shape to first rack portion 72, but is formed of a harder, preferably metallic material such as steel.

As is shown in FIG. 5, system 10 is designed to be powered by electricity and by air pressure which is provided from a supply line 82. A filter/regulator/lubricator assembly 84 is provided to condition pressured air before it reaches the system 10. A pressure switch 86 is provided in a pneumatic inlet line to system 10. Pressure switch 86 sends a signal to a central processor unit (CPU) 120 in the event that pressure in the inlet line drops beneath a predetermined minimum.

As is shown in FIG. 5, the inlet line is subdivided into a first pneumatic line 88 for providing power to first shifting assembly 42, and a second pneumatic line 90, which is used to power second shifting assembly 44. A solenoid actuated valve VS controls whether air is allowed to flow from the inlet line 82 into first pneumatic line 88. First pneumatic line 88 communicates with a container 92 at a top portion thereof which contains an air space 94. A lower portion of container 92 contains hydraulic oil 96, and a hydraulic pressure line 98 leads out from the lower portion of container 92 which contains the hydraulic oil 96. This provides what is known as an "air over oil" buffer, which ensures that first shifting assembly 42 will operate as smoothly as possible.

A pair of flow rate controls are interposed within hydraulic pressure line 98 for controlling the rate of speed at which first shifting assembly 42 will operate. Hydraulic pressure line 98 is connected at an opposite end from container 92 to a first chamber 104 within a cable cylinder unit 102. A piston 103 is provided within cable cylinder unit 102 to separate first chamber 104 from a second, opposite chamber 106. A cable 108 is connected to piston 103 and is wound around a pulley 110 that is integrally mounted to the body of cable cylinder unit 102. Cable 108 is connected at an end opposite from piston 103 to first support member 38, as is shown in FIG. 5. A pawl 112 is provided on first support member 38 for actuating first and second limit switches LS1, LS2 and a limit valve LV1, for purposes that will be operationally described below.

Second pneumatic line 90 is connected to a pneumatically-actuated valve PV1. Pneumatically-actuated valve PV1 controls second shifting assembly 44. Second shifting assembly 44 includes a cylinder 118 having a first chamber 114 and a second chamber 116. A piston 117 separates first chamber 114 from second chamber 116, and is integral with second support member 40.

Figure 6:
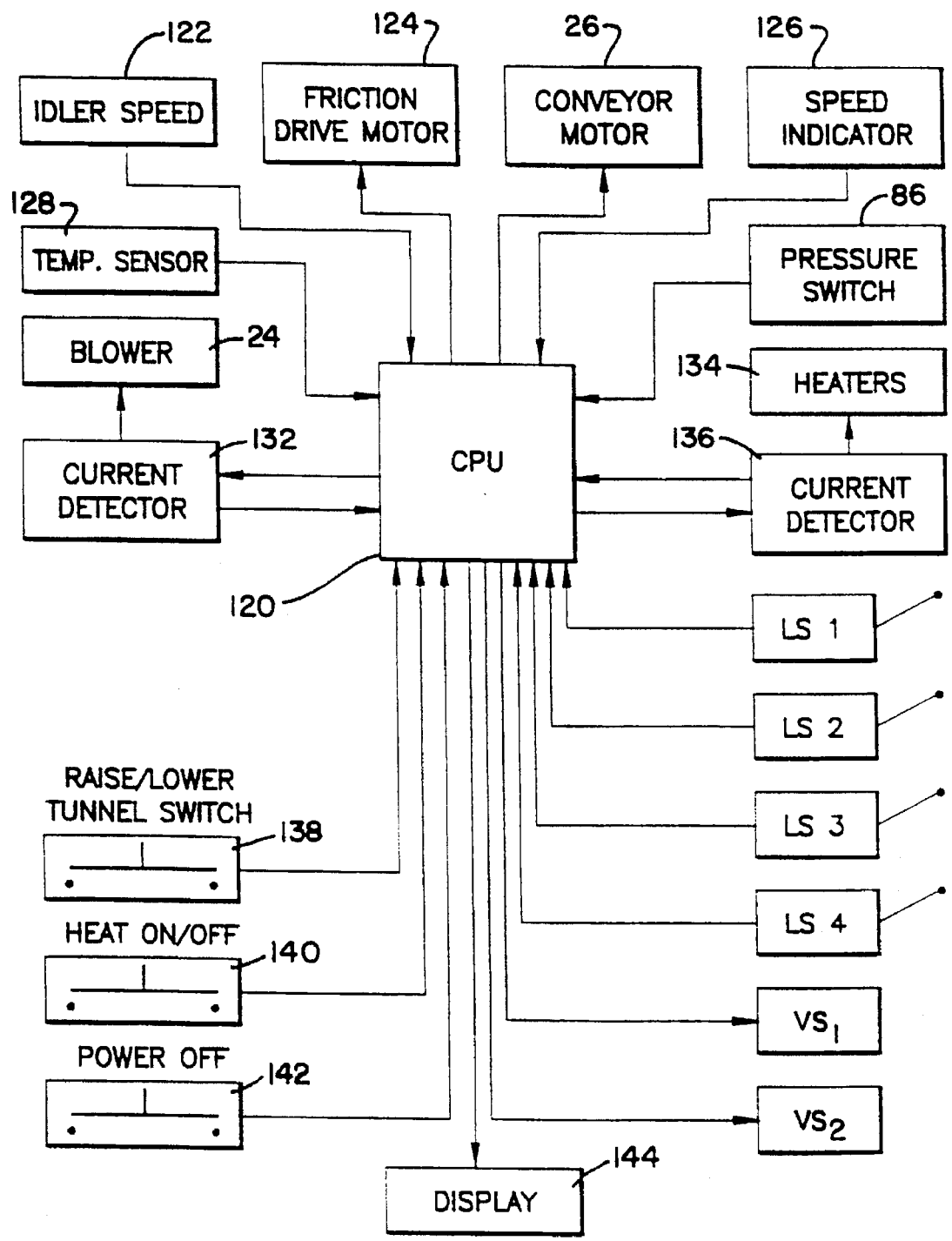
FIG. 6 is a schematic representation of the electronic components of the control system used in the system depicted in FIGS. 1–5.

Referring now to FIG. 6, operation of system 10 and heat tunnel assembly 18 is operationally controlled by a CPU 120. An idler speed detector 122 senses the rotational speed of one or more of the four idlers 60, 62, 64 and 66. This information is reported to CPU 120, which determines if the speed is inordinately low with respect to the speed that drive pulley 58 is being driven at. If the speed is low, this is an indication that the friction belt 56 has probably broken, which creates an error condition. The friction drive motor 124 that powers drive pulley 58 is controlled directly from CPU 120, as is also shown is FIG. 6.

Conveyor motor 26 is also controlled by CPU 120. A speed indicator 126 is provided to sense the speed of the links 76 on conveyor 14. Speed indicator 126 reports such information to CPU 120, which can thus detect conditions such as chain breakage or a conveyor speed which is outside of acceptable parameters.

A temperature sensor 128 is provided within heat tunnel assembly 18. Temperature sensor 128 reports temperature data to CPU 120, as is shown in FIG. 6. Pressure switch 86 also electronically reports to CPU 120 when pressure in the inlet line falls beneath the predetermined minimum. A blower 24 for circulating air within heat tunnel assembly 18 is controlled by CPU 120 via a current detector 132. When current detector 132 indicates that not enough or an inordinate amount of current is being required by blower 24, it reports such information to CPU 120, generating an error condition. similarly, the heating elements 30, 34 are controlled via CPU 120 via a current detector 136. If current detector 136 indicates that not enough or too much current is being consumed by a heating element 30–34, it reports such information to CPU 120, again generating an error condition.

Limit switches LS1, LS1, LS3, LS4 all provide 30 input to CPU 120. CPU 120 further is designed to control the position of solenoid-actuated valves VS, and VS2. CPU 120 is further responsive to the position of a switch 138 on a control panel which an operator uses to manually initiate raising or lowering of the cantilevered portioned 36 of the first support member 38. A switch 140 is further provided on the control panel for switching the heat from upper and lower heat sources 28, 32 on and off. Switch 140 provides input to CPU 120. A third switch 142 is provided on a control panel for completely shutting electrical power off from the system 10. This is coordinated by the CPU 120, which receives the input signal from switch 142. CPU 20 also provides data to a display unit 144, which can be a CRT or other type of readout.

System Operation

The operation of a system 10 according to the preferred embodiment of the invention will now be described. Station 12 applies a heat shrinkable sleeve or label to a vial, and the vial is transported with the sleeve thereon past sleeve positioning system 16 by conveyor 14. At sleeve positioning station 16, the sleeve or label is positioned precisely with respect to the vial. Conveyor 14 then conveys the vial and sleeve into the heat tunnel assembly 18. At this point, each of the vials 50 are positioned between two adjacent roller members 48. As the conveyor 14 transports the roller members 48 into the infeed section, the rollers 48 are engaged on their lower surfaces 80 by friction belt 56, thereby rotating the rollers 48 at a first rate in a clockwise direction. As may be seen in FIG. 3, the infeed section is where the vials 50 are first exposed to the high temperatures within the heat tunnel assembly 18. Most of the shrinkage of the sleeve or label occurs during this initial infeed section. This rolling of the vials 50 at a first, relatively high rate of speed, results in a precise, uniform shrinkage of the label or sleeve over the vial 50, to assure that the printing on the shrink wrap material remains legible and undisturbed.

In one example of the invention which has proven successful, first roller drive assembly 52 is driven so that the vials 50 are induced to rotate at a rotary speed of approximately 190 rpm. In this example, the vials 50 had an outer diameter of approximately $7/8$ of an inch, and the roller members 48 had an outer diameter of approximately 1 and $1/8$ of an inch. The optimum length the infeed section at a conveyor speed of approximately 22.5 ft. per minute is from about 4 inches to 8 inches. In the example that has proven successful, the infeed section has a length of approximately 5.5 inches.

Conveyor 14 continues to transport each vial 50 to the right, as viewed in FIG. 3, past the first roller drive assembly 52 until the spur gears 78 on the respective roller members 48 which support each vial 50 engage the first rack portion 72 of rack 70. Conveyor 14 continues to move to the right, as viewed in FIG. 3, as the spur gear 78 engage rack 70. This causes the roller members 48 to rotate in a clockwise direction, as viewed in FIG. 3, at a second rate which is slower than the first rate induced by first roller drive assembly 52. Due to the resilient material from which first rack portion 72 is fabricated, rotation of roller members 48 is started as smoothly with as little shock as possible. Roller members 48 continue to rotate as conveyor 14 transports them over the slow rotation baking zone and over the remainder of rack 70. During this period of time, the label or sleeve is completely shrunk about the vial 50. Because the second rate of speed is slower, slippage of the sleeve with respect to the vial as a result of any slight taper that the vial may have is minimized. In the example mentioned above which has proven successful, the second rate of speed caused the vials 50 to rotate at approximately 76 rpm. Preferably, the first rate of rotation should be 1.5 to 5 times the second rate of rotation.

Conveyor 14 then transports the vials 50 out of the heat tunnel assembly 18 past the ultraviolet sleeve detector 20. If sleeve detector 20 indicates that the sleeve has been correctly applied, the vial 50 is sent on for further packaging or processing.

During the above process, an error condition can be generated by one of a number of inputs to the CPU 120. If the idler speed indicator 122 indicates a speed which is inconsistent with the rotation of drive pulley 58, a signal is sent to CPU 120, since such a condition will usually reflect breakage or slipping of the friction belt 56 in first roller drive assembly 52. Likewise, speed indicator 126 feeds a signal to CPU 120 which reflects the speed at which the links 76 in conveyor 14 are travelling. A speed which is outside of normal parameters can generate an error condition in CPU 120. A temperature sensor 128 is provided within heat tunnel assembly 18. Too high or too low a temperature can generate an error condition in CPU 120. Pressure switch 86 continuously monitors the pneumatic pressure of compressed air which is supplied to the system 10. If the pressure drops beneath a predetermined minimum, an error condition is generated in CPU 120. Current detectors 132, 136 are provided for blower 24 and heaters 134, respectively. If current detectors 132, 136 indicate that an inordinate amount of current or an insufficient amount of current is being consumed by the blower 24 or heaters 134, respectively, CPU 120 generates an error condition.

When an error condition is indicated within CPU 120, CPU 120 actuates first shifting assembly 42 and second shifting assembly 44 to withdraw the upper heat source 28 and lower heat source 32 away from the conveyor 14 within the heat tunnel assembly 18. Simultaneously, CPU 120 shuts off power to the heaters, blowers and motors. To initiate this process, CPU 120 instructs solenoid-actuated valve VS, to move to its open position. This introduces compressed air into first pneumatic line 88 and into container 92, thereby inducing a positive hydraulic pressure into hydraulic pressure line 98. At a rate which is determined by the position of the flow rate controls 100, hydraulic fluid is forced into the first chamber 104 of the cable cylinder unit 102, causing piston 103 to move downwardly, as is illustrated schematically in FIG. 5. This causes cable 108 to retract into the cylinder 102. Cable 108, which is wrapped about pulley 110, thus causes first support member 38 to move upwardly, thereby vertically withdrawing the cantilevered portion 36 which contains the upper heat source 28 from the conveyor 14. As this occurs, the pawl 112 on first support member 38 is moved out of contact with limit switch LS1 and moves upwardly, contacting valve LV1. This moves LV1 to its open position causing compressed air from second pneumatic line 90 to enter into a chamber into pressure control valve PV, so that PV, is moved to the left as indicated in FIG. 5, or to the position which routes compressed air from second pneumatic line 90 to the first chamber 114 in cylinder 118. Valve LV, is positioned at a vertical location which corresponds to the point at which cantilevered portion 36 has risen to the extent necessary to allow the second support member 40 and the lower heat source 32 mounted thereon to horizontally withdraw from beneath the conveyor 14.

First support member 38 continues to move upwardly until pawl 112 contacts limit switch $LS_2$. This condition is noted by CPU 120. Simultaneously, second support member 40 continues to retract into cylinder 118 until the pawl 119 which is integral with second support member 40 contacts limit switch LS4. CPU 120 notes the actuation of limit switch LS4 at this point.

When the cause for the error condition has been resolved, an operator pushes switch 138, instructing the CPU 120 to return the heat tunnel assembly 18 to its operational position. To do this, CPU 120 instructs solenoid-actuated valve VS2 to move to its open position. This introduces compressed air from second pneumatic line 90 into a chamber within pressure control valve PV, which moves PV, to a position which communicates second pneumatic line 90 with the second chamber 116 in cylinder 118. As a result, second support member 40 is advanced until lower heat source 32 is in its operational position beneath conveyor 14. When this occurs, limit switch LS3 is actuated by pawl 119. When a signal indicating this position is received from LS3, CPU 120 moves solenoid control VS, to its closed position. This allows hydraulic fluid in the first chamber 104 of cable cylinder unit 102 to return under the force of gravity to container 92 via hydraulic pressure line 98. As a result, first support member 38 and its cantilevered portion 36 which supports upper heat source 28 is lowered into the operational position. Valve LV1 is constructed so that pawl 112 will not actuate it when first support member is moving downwardly. When the upper heat source 28 reaches its operational position above conveyor 14, pawl 112 will actuate limit switch LS1. At this point, the CPU 120 will actuate the motors 26, 124, blower 24, and heaters 134 to return the heat tunnel assembly 18 to its normal mode of operation.

Second Embodiment

Figure 7:
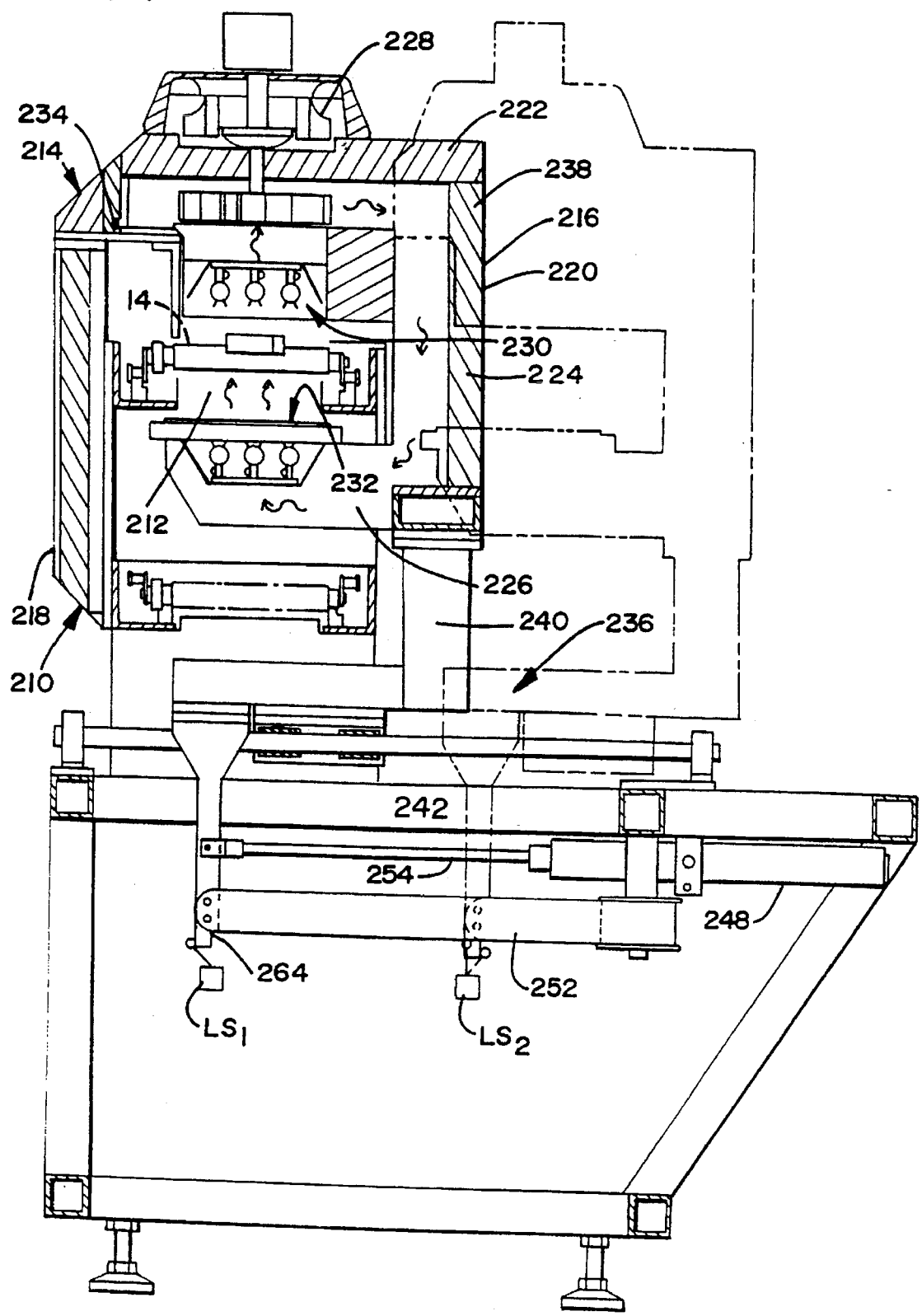
FIG. 7 is a elevational view in partial cross-section of an improved fail safe heating tunnel assembly in a system constructed according to a second embodiment of the invention.
Figure 8:
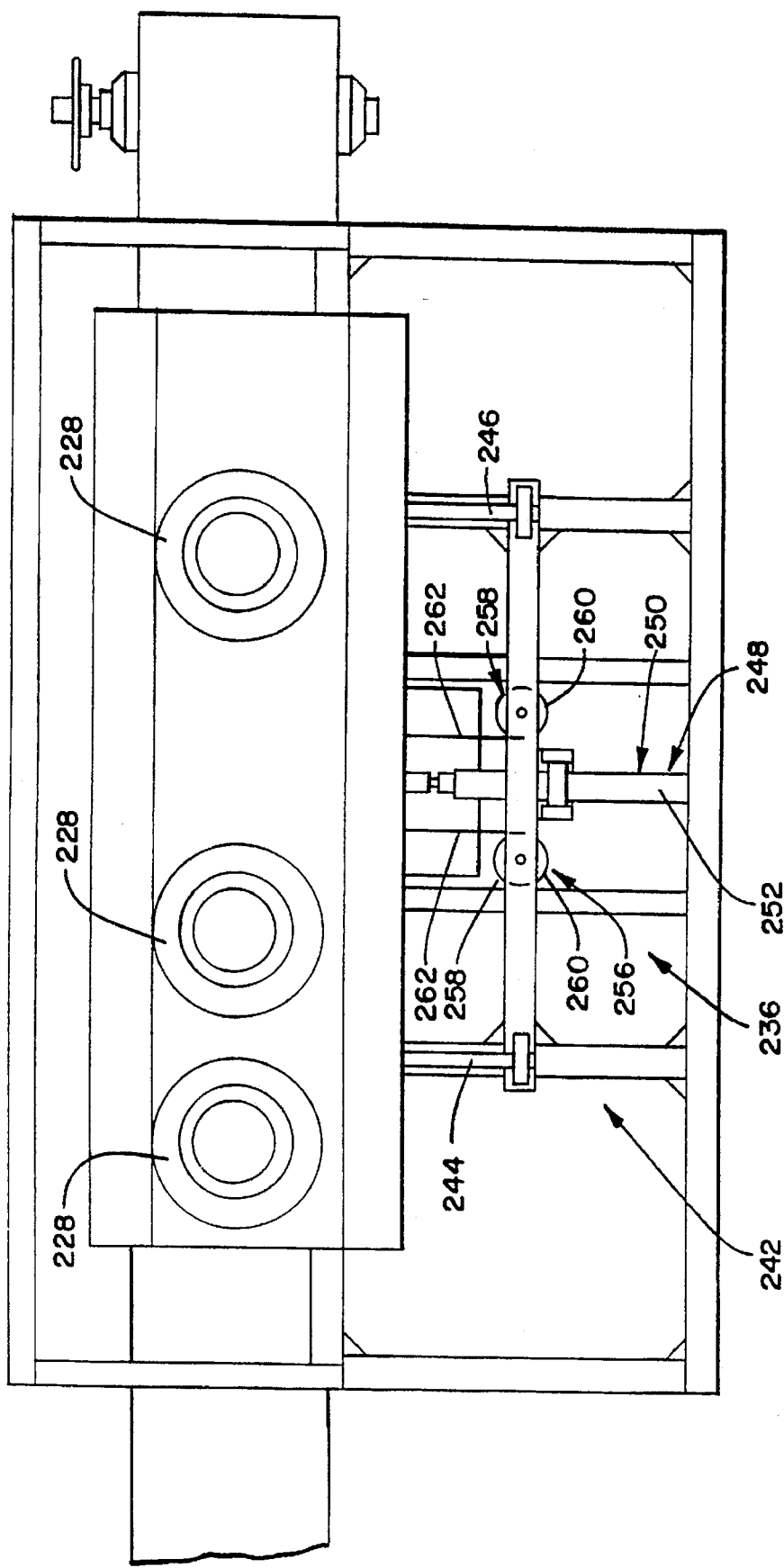
FIG. 8 is a top plan view of a heating tunnel assembly in the system constructed according to the embodiment depicted in FIG. 7.

According to a second, preferred embodiment of the invention, a system for applying a heat-shrinkable sleeve to a container will include an improved fail safe heating tunnel assembly 210, shown in FIGS. 7–10. Referring first to FIGS. 7 and 8, it will be seen that fail safe heating tunnel assembly 210 includes an insulated heating chamber 212 that is defined by a first stationary portion 214 and a second, removable portion 216. First stationary portion 214 includes an insulated wall 218, as may be seen in FIG. 7. Second, removable portion 216 includes a C-shaped frame 220 having an upper portion 222, a side portion 224 and a lower portion 226, all of which are preferably insulated by an insulation material 238. A plurality of circulation fans 228 are also preferably mounted to the C-shaped frame 220 of the second removable portion 216, as may be seen in FIGS. 7 and 8. The purpose of circulation fans 228 is to create a circulation pattern within insulated heating chamber 212 that is generally indicated by the circulation arrows in FIG. 7. The C-shaped frame 220 of second removable portion 216 further has a heater mounted thereto, which preferably includes a plurality of upper heating elements 230 and a corresponding plurality of lower heater elements 232. As may be seen in FIG. 7, conveyor 14 is positioned within heating chamber 212, between the upper heater elements 230 and the lower heater elements 232.

In order to prevent heated air and fumes from escaping from the insulated heating chamber 212, a seal 234 is positioned at an inner face between the first stationary portion 214 and the second removable portion 216 of heating tunnel assembly 210. More specifically, seal 234 is positioned at a boundary between the insulated wall 218 of first stationary portion 214 and the upper portion 222 of the C-shaped frame 220 of second removable portion 216.

Referring again to FIGS. 7 and 8, a moveable mounting assembly 236 is provided for mounting the second removable portion 216 of insulated heating chamber 212 for movement between a first position wherein the second removable portion 216 is engaged with first stationary portion 214, and a second retracted position wherein second removable portion 216 is remote from the first stationary portion 214. In FIG. 7, the second removable portion 216 is shown in the first engaged position, with the second retracted position being shown in phantom lines. Most preferably, the movable mounting assembly 236 constrains the second removable portion 216 to move linearly with respect to first stationary portion 214 in a substantially horizontal plane. This minimizes the force and energy that is required to move the second removable portion 216 between the engaged and remote positions.

Looking again to FIGS. 7 and 8, moveable mounting assembly 236 preferably includes a support arm 240 that is securely mounted to the C-shaped frame 220 of second removable portion 216 at a first end, and is supported by a slide bearing assembly 242 at a second, lower end. As may be seen in FIG. 8, the slide bearing assembly 242 includes a first slide bearing 244 and a second slide bearing 246. It is on slide bearing assembly 242 that the second removable portion 216 is mounted to move between the engaged and remote positions.

Fail safe heating tunnel assembly 210 further includes an actuator system 248 for moving the second removable portion 216 of insulated heating chamber 212 into the engaged position. In the preferred embodiment, actuator system 248 includes a piston cylinder assembly 250 that includes a cylinder 252 and a piston 254. Cylinder 252 is preferably mounted to a stationary outer frame of the assembly 210, while piston 254 is operatively connected to the support arm 240 which is mounted for linear horizontal movement on moveable mounting assembly 236. As an alternate embodiment, a motor may be substituted for the piston cylinder assembly 250 for driving the actuator system 248.

According no one important aspect of the invention, heating tunnel assembly 210 includes a biasing system 256 that resiliently biases the second removable portion 216 of the heating chamber 212 toward the retracted position, so that the heating tunnel assembly will be opened to prevent products from burning in the event that an emergency occurs which disables the actuator system 248. In the preferred embodiment, the biasing system 256 includes a pair of clock-type springs 258 which include spools 260, respectively, that are mounted to the stationary outer frame of the heating tunnel assembly. Springs 262 extend outwardly from the respective spools 260 and are under tension. The distal end of each of the springs 262 is operatively connected to the support arm 240 of the second removable portion 216.

Referring briefly to FIG. 7, a cam 264 is preferably mounted to a component of the assembly 210 that moves with the second removable portion 216 of heating chamber 212. When the removable portion 216 is in the engaged position, cam 264 will actuate a first limit switch $LS_1$. When removable portion 216 is in the remote position, it will instead actuate a second limit switch $LS_2$.

Figure 9:
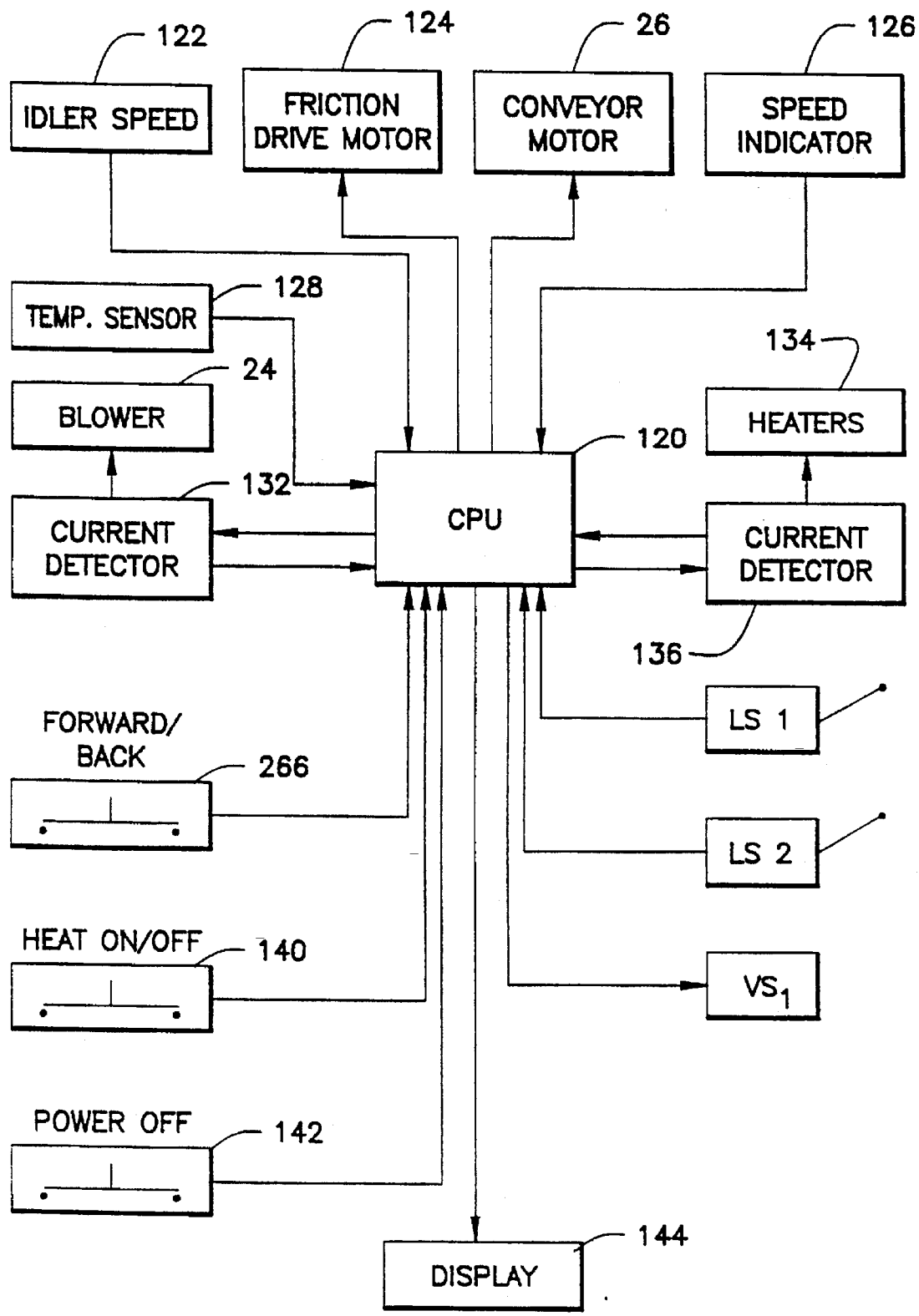
FIG. 9 is a schematic representation of the electronic components of the control system used in the system constructed according to the embodiment of FIGS. 7 and 8.

Referring briefly to FIG. 9, the control system for a system according to the second embodiment is identical to that described in reference to the first embodiment, except that there is no pressure switch 86, there are but two limit switches $LS_1$, $LS_2$, and but one solenoid actuated valve $VS_1$. In addition, the system according the second embodiment includes a forward/back switch 266 in lieu of the raise/lower tunnel switch 138 that was provided in the first embodiment.

Figure 10:
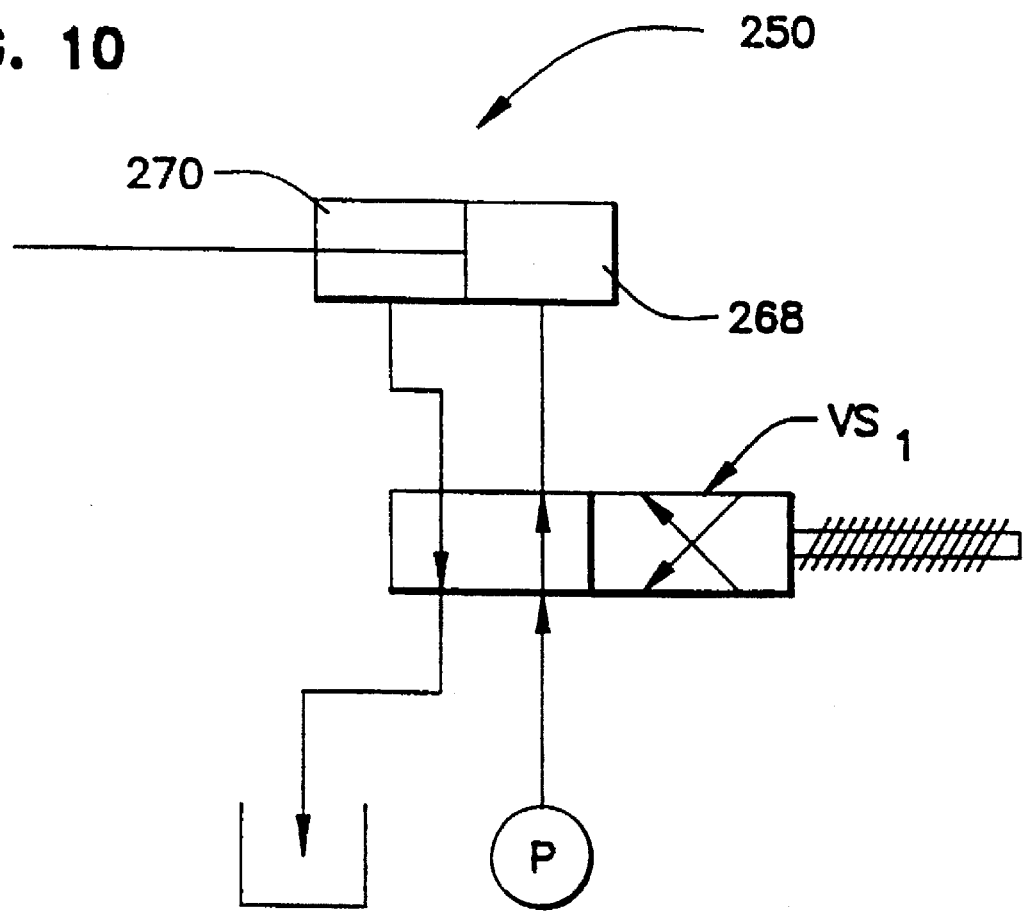
FIG. 10 is a schematic depiction of one subsystem in the embodiment of the invention that is depicted in FIGS. 7–9.

FIG. 10 depicts how solenoid actuated valve $VS_1$ actuates the piston cylinder assembly 250. When power is supplied to $VS_1$ by instruction from the CPU 120, a pneumatic pressure source P is communicated with a first chamber 268 in piston cylinder assembly 250, which will urge the second removable portion 216 toward the engaged position. If $VS_1$ is not so actuated, the pressure source P will instead be communicated with a second chamber 270, which will urge the piston, and thus the second removable portion 216, toward the second, retracted position.

In operation, a system 10 including the fail safe heating tunnel assembly 210 will operate as described above with reference to the first embodiment, except as follows. During normal operation, CPU 120 will actuate solenoid actuated valve $VS_1$ so that the pressure source is in communication with the first chamber 268 of piston cylinder assembly. This will urge the second removable portion 216 of the heating tunnel assembly toward its engaged position, so that second removable portion 216 will be sealed with respect to first stationary portion 214 of heating chamber 212. CPU 120 senses that second removable portion 216 is in the engaged position by means of first limit switch $LS_1$. If an error condition is generated by any of the above described inputs to CPU 120, CPU 120 will shut off power to the heater elements 230, 232 and to the circulation fan 228. It will further shut off actuation power to $VS_1$, causing pressure to be applied to the second chamber 270 of piston cylinder assembly 250, which will cause the second removable portion 216 to horizontally retract on the moveable mounting assembly 236. CPU 120 will sense when second removable portion 240 is in the retracted position by means of second limit switch $LS_2$.

In certain system emergency situations, the source P of pressure may also be disabled. In that case, when $VS_1$ is disabled, second removable portion 216 will be pulled into the retracted position as a result of the force that is applied by the biasing system 256. Accordingly, the heating tunnel assembly will be opened to prevent products from overheating or burning even in the event of an emergency that disables both electrical power and pressure.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of applying a heat-shrinkable label to a container, comprising:

(a) fitting a heat-shrinkable label about a container;

(b) conveying the container with the label along a path;

(c) positioning a heat tunnel assembly along the path whereby the label will be shrink-fitted onto the container, said heat tunnel assembly comprising:

(i) an insulated heating chamber defined by a first stationary portion and a second removable portion, said second portion having a substantially C-shaped cross-section;

(ii) a heater positioned within said insulated heating chamber;

(iii) movable mounting means for mounting said second removable portion of said insulated heating chamber for movement in a substantially horizontal plane between a first position engaged with said first stationary portion, and a second retracted position remote from said first portion;

(iv) actuator means for moving said second removable portion of said insulated heating chamber into its engaged position; and (v) biasing means for resiliently biasing said second removable portion of said chamber toward said retracted position; and (d) deactivating the actuator means in the event of an emergency, whereby said heating tunnel assembly will be opened to prevent said container and label from overheating or burning.

2. A method according to claim 1, wherein step (b) comprises conveying a cylindrical container along the path by using a conveyor having rollers mounted thereon.

3. A method according to claim 1, wherein the actuator is a piston-cylinder assembly, and wherein step (d) is performed by changing a condition of the actuator.

* * * * *